(12) United States Patent
Berg

(10) Patent No.: US 6,289,936 B1
(45) Date of Patent: Sep. 18, 2001

(54) METHOD FOR BINDING A CONNECTING PIPE TO A PRINCIPAL PIPE WHICH HAS BEEN RECONSTRUCTED WITH A RELINING PIPE OF PLASTIC MATERIAL

(75) Inventor: Immo-Claudius Berg, Bremen (DE)

(73) Assignee: F. W. Hundhausen GmbH Kunststoffwerk, Achim (DE)

( * ) Notice: Subject to any disclaimer, the term of this patent is extended or adjusted under 35 U.S.C. 154(b) by 0 days.

(21) Appl. No.: 09/619,107

(22) Filed: Jul. 19, 2000

(30) Foreign Application Priority Data

Jul. 20, 1999 (DE) .............................................. 199 33 977

(51) Int. Cl.$^7$ ...................................................... F16L 55/16
(52) U.S. Cl. ................................ 138/98; 138/97; 285/55; 264/269; 156/287
(58) Field of Search ......................... 138/98, 97; 285/55, 285/133.11, 21.1; 264/36.1, 269; 156/287

(56) References Cited

U.S. PATENT DOCUMENTS

| | | | |
|---|---|---|---|
| 5,275,442 | * | 1/1994 | Keldany .................................. 285/55 |
| 5,577,776 | * | 11/1996 | Welch ..................................... 285/55 |
| 5,778,937 | * | 7/1998 | Sundermann ...................... 138/98 X |
| 5,954,371 | * | 9/1999 | Koke et al. ............................. 285/55 |
| 6,148,581 | * | 11/2000 | Separautzki ........................ 285/55 X |

FOREIGN PATENT DOCUMENTS

1383155 * 11/1964 (FR) ....................................... 285/55

* cited by examiner

Primary Examiner—Patrick Brinson
(74) Attorney, Agent, or Firm—Schiff Hardin & Waite

(57) ABSTRACT

A method for binding a connecting pipe to a principal pipe which has been reconstructed with a relining pipe of plastic material comprises determining the mid-point of the opening in the principal pipe located in the proximity of that end of the connecting pipe pointing toward the principal pipe, producing an opening in the relining pipe in the region of the mid-point by heating the plastic material from the interior of the relining pipe and proceeding toward the exterior, widening the produced opening by simultaneously exerting pressure on the inside of the relining pipe in the direction toward the connecting pipe and heating the region of the plastic material on which pressure is being applied to form a collar around the widened opening, applying the plastic material of the collar projecting into the connecting pipe to the inside of the end of the connecting pipe adjacent the principal pipe, fastening the collar of the plastic material to the inside of the connecting pipe and then further flattening and fastening the collar of the plastic material to the inside of the connecting pipe.

16 Claims, 6 Drawing Sheets

METHOD FOR BINDING A CONNECTING PIPE TO A PRINCIPAL PIPE WHICH HAS BEEN RECONSTRUCTED WITH A RELINING PIPE OF PLASTIC MATERIAL

BACKGROUND OF THE INVENTION

The present invention is directed to a method for binding a connecting pipe to a principal pipe which has been reconstructed with a relining pipe of plastic material.

When a connecting pipe is no longer connected leak-free to a main pipe, for example due to slumping, the main pipe is reconstructed by inserting a relining pipe of plastic into the main pipe. Subsequently, the connecting pipe is reconnected to the reconstructed main pipe. To this end, it is necessary that an opening be produced in the relining pipe in the region of a tap opening located in the proximity of that end of the connecting pipe pointing toward the main pipe. In the prior art, this occurs by milling, cutting, welding or with lasers. All of the above-mentioned opening methods, however, exhibit the following disadvantages:

i) Tools that must be repeatedly reconditioned are required for forming the opening.

ii) No seepage-free connection between the main pipe and the connecting pipe is possible.

iii) The ground water is jeopardized even more by gap formations between the main pipe and the connecting pipe.

iv) Considerable damage can be caused given an incorrect measuring or, respectively, tap openings that are not 100% localized. This then requires access and, thus, causes considerable costs.

v) Only certain cross-sectional sizes can be opened.

SUMMARY OF THE INVENTION

The present invention is based on the object of providing a method for optimum binding of a connecting pipe to a principal pipe.

This object is achieved by a method of binding a connecting pipe to a principal pipe which has been reconstructed with a relining pipe of plastic material, said method comprising the steps of localizing or determining the mid-point of the opening in a principal pipe located in the proximity of the end of the connecting pipe pointing toward the principal pipe, said determining or locating being from the inside of a relining pipe; producing an opening in the relining pipe in the region of the localized mid-point by heating the plastic material of the relining pipe located in said region proceeding from the inside of the relining pipe; widening the opening by simultaneously exerting pressure on the inside of the relining pipe in the direction toward the connecting pipe and heating the region of the plastic material on which the pressure is exerted from the inside of the relining pipe toward the connecting pipe to form a projecting portion which extends into the connecting pipe; applying the projecting portion of the plastic material of the relining pipe to the inside of that end of the connecting pipe pointing toward the principle pipe; fastening the plastic material of the projecting portion to the inside of the connecting pipe and flattening the plastic material of the projecting portion as it is fastened to the inside of the connecting pipe.

In particular, it can thereby be provided that the mid-point is localized or determined either with ultrasound or sonar technology.

The heating temperature for producing an opening is preferably selected dependent on the nature of the material. Beneficially, the heating temperature for widening the opening is selected dependent on the nature of the plastic material.

It can also be provided that the opening is widened into either a round opening or an oval opening.

Advantageously, the projecting portion of the plastic material projecting into the connecting pipe is applied beginning at that end of the connecting pipe pointing toward the principal pipe. Then the material is progressively formed against the inside of the connecting pipe inward of that end.

In another particular embodiment of the invention, it can be provided that the projecting portion of the plastic material is secured to the inside of the connecting pipe by applying-glue or by welding the plastic material thereto.

Beneficially, the end of the projecting portion of the plastic material extending into the connecting pipe is flattened by heating. It can also be provided that the end of the projecting portion of the plastic material can be flattened by stretching. In both cases, the flattening can cause a tapering or thinning of the material at the end of the projecting portion.

Finally, it can be provided that the shaping of the connection is monitored by a semi-electronic method or a semi-mechanical method. Included within what is to be understood as shaping is the cross-sectional shape of the connection, for example oval or round, and the angle of the projecting portion relative to the principal pipe.

The invention is based on the surprising perception that the plastic material of the relining pipe that must normally be removed for producing an opening to the connecting pipe can be employed for producing a seepage-free connection between the principal pipe and the connecting or branch pipe. This means that an optimum connection can be realized without additional material. The shape of the connection as well as the entry angle are thereby not impediments to forming the connection. Moreover, all types of plastic can be processed. Over and above this, there is no damage to the principal pipe or the carrier pipe.

Other advantages and features of the invention will be readily apparent from the following description of the preferred embodiments, the drawings and claims.

BRIEF DESCRIPTION OF THE DRAWINGS

FIGS. 2–6 are cross-sectional views showing various phases of the specific embodiment of the inventive method with:

FIG. 2 illustrating the beginning of forming the openings;

FIG. 3 showing a formation of the opening and the beginning of spreading the material adjacent the opening into a projecting collar or portion;

FIG. 4 showing forming the projecting collar or portion of the plastic material around the opening onto the inside of the connecting pipe;

FIG. 5 showing heating to bond the material of the projecting collar or portion to the inside of the pipe; and FIG. 6 showing further stretching and working of the projecting collar or portion of the plastic material to form a tapered portion at the end of the projecting collar.

DESCRIPTION OF THE PREFERRED EMBODIMENTS

Figure 1:
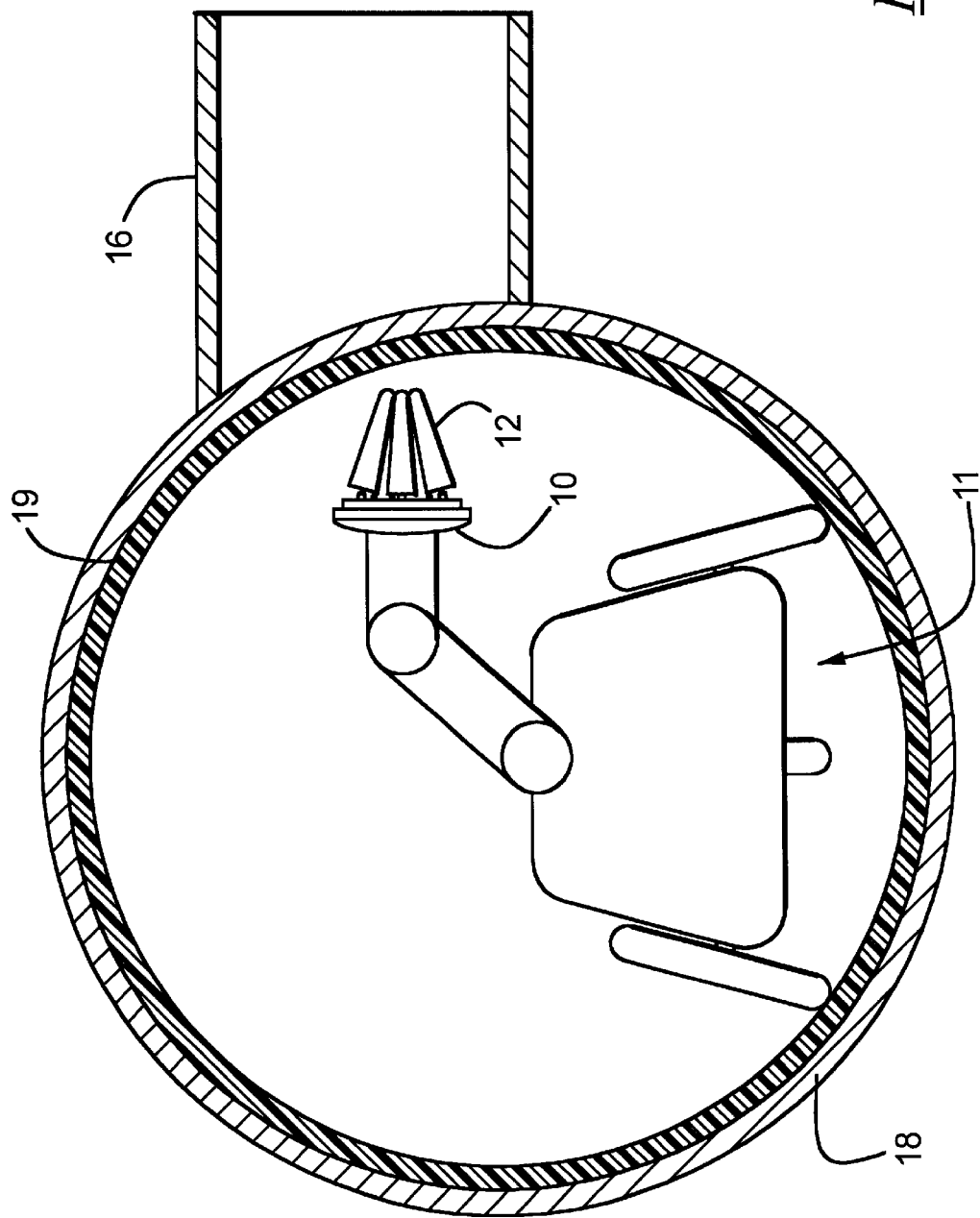
FIG. 1 is a cross-sectional view through a reconstructed principal pipe in which a device for the implementation of a specific embodiment of the method of the present invention is located.

As illustrated in FIG. 1, a principal pipe 18 is provided with a lining or relining pipe 19 of a plastic material. A displacement means 11 is introduced into the interior of the principal pipe within the relining pipe 19 and is provided with a localization means 10 and a working head 12. Alternatively, the working head 12 could also be located on a probe. The localization means 10 can, for example, comprise an ultrasound device or sonar device. Dependent on its size, for example, a working head can have more than 2–10 heating devices (not shown) provided thereon.

In FIGS. 2–6, for the sake of clarity, the displacement means 11 has been omitted and the localization means 10 and the working head 12 have not been shown true-to-scale. The working head 12 comprises a plate 12a on which three fingers 12b are arranged in the present embodiment. These fingers are pivotable and spaced on pivot points due to the action of hydraulic cylinders 20, with two cylinders arranged for each finger. Over and above this, the fingers 12b are displaceable in a radial direction due to the displaceability of the hydraulic cylinders 20, which can pivot on the plate 12a. The working head 12 is rotatable by 360° around an x-axis and by 120° around a y-axis in common with the localization means 10. As a result thereof, the plastic material of the relining pipe 19 can be continuously shaped into the desired shape with respect to the inside of a connecting pipe 16.

One or more heating devices 14 are located in the tip of each of the fingers 12b. In addition, additional heating devices 24 (see FIG. 5) for melting the plastic material of the relining pipe 19 are located along the fingers 12b, dependent on the required amount of heat, and these are omitted from FIGS. 2–4 for the sake of clarity.

Figure 2:
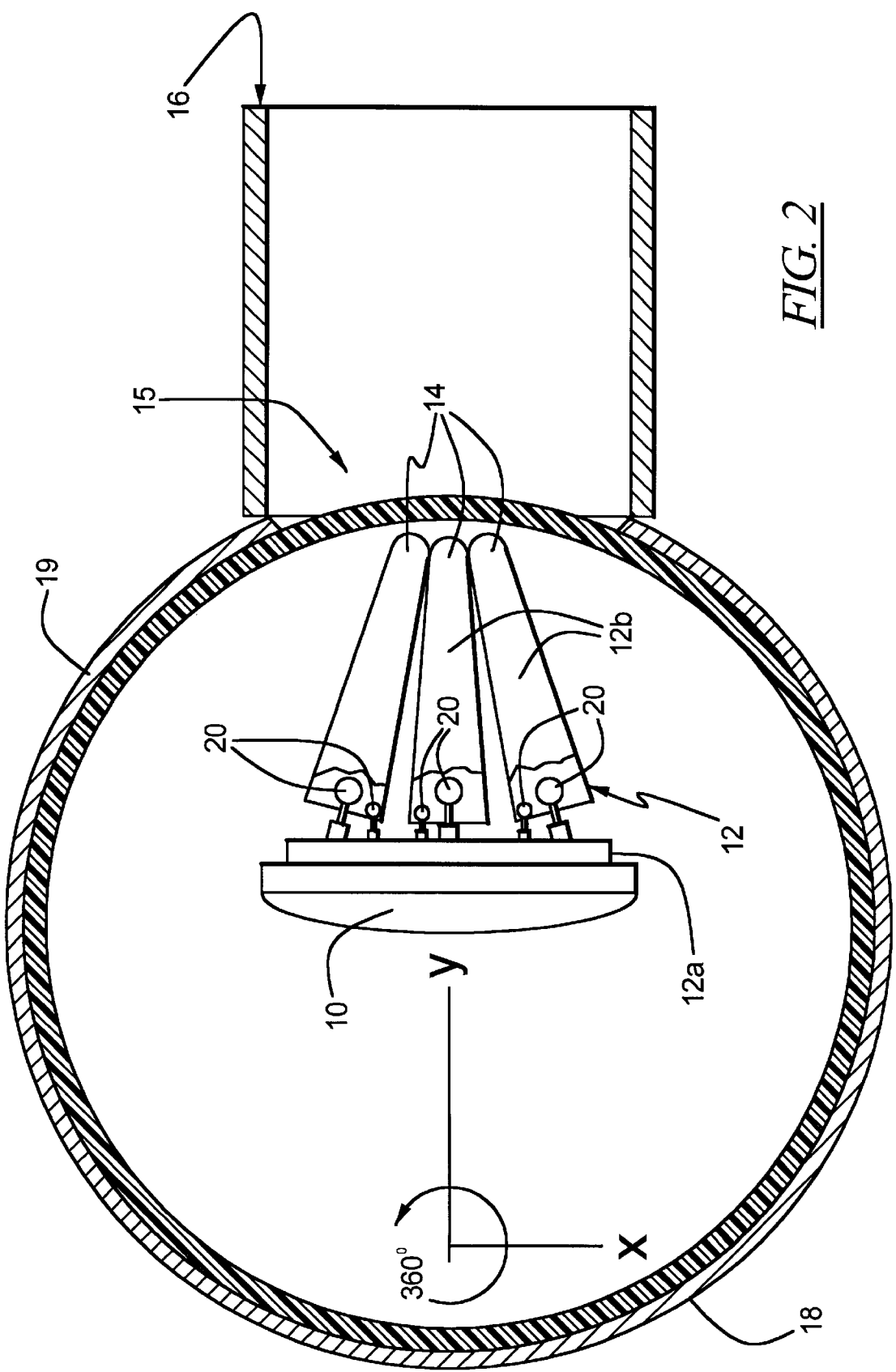
Figure 3:
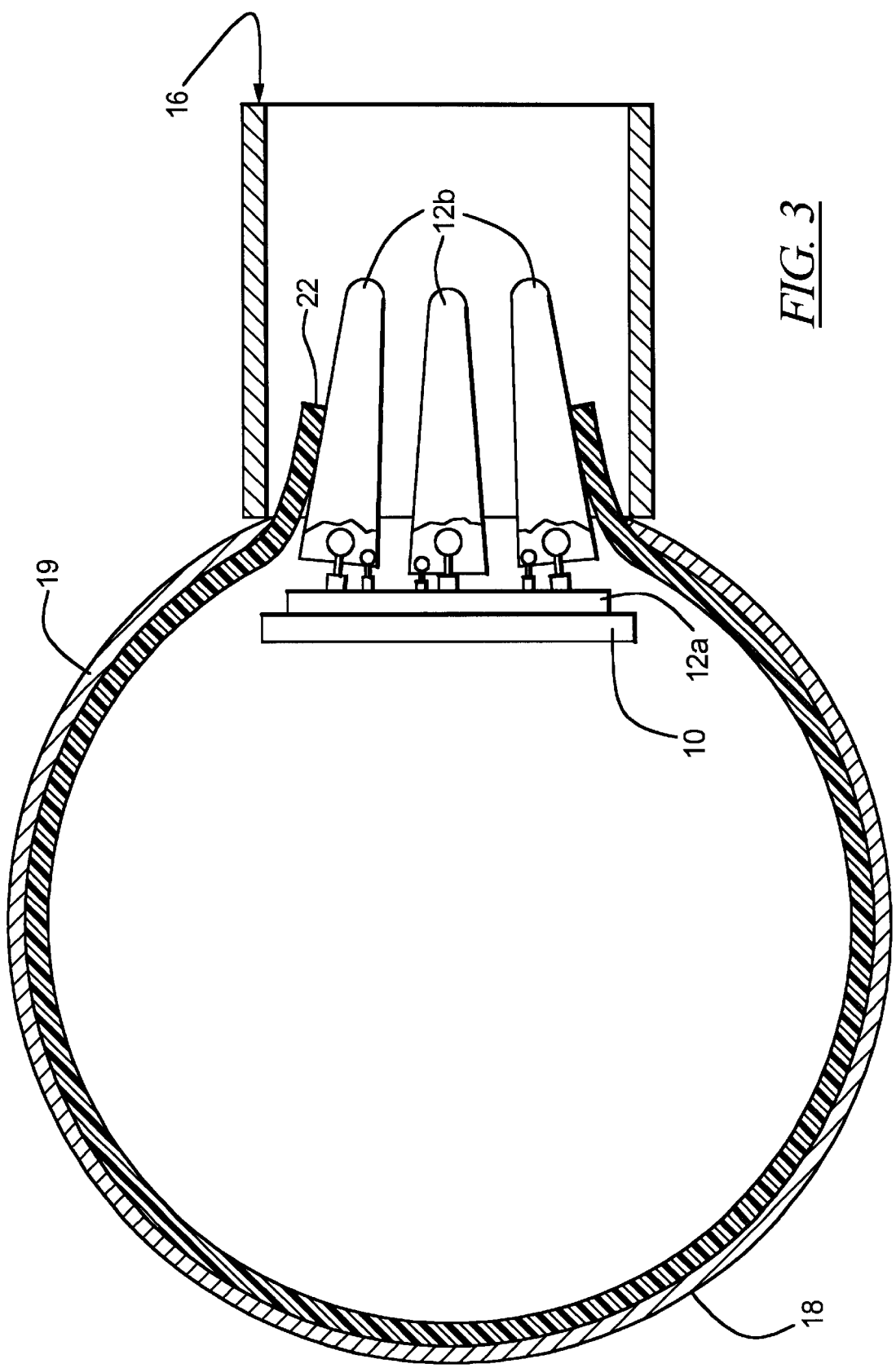

In FIG. 2, the localization means 10 is used for locating or determining the mid-point of an opening 15, which is located in the proximity of the end of the connecting or branch pipe 16 pointing toward the principal pipe 18. The working head 12 together with the localization means 10 is advanced in the direction of the connecting pipe 16 between the method steps shown in FIGS. 2 and 3, which will result in the heating device 14 touching the plastic material of the relining pipe 19 in the region around the localized mid-point of the opening 15 to melt the plastic material. The opening which is produced is widened in FIG. 3 by further heating devices 24 (see FIG. 5), which heating devices 24 are preferably in the form of thermal elements. Further advancing of the working head 12 in common with the localization means 10 into the connecting pipe 16 will result in a pressure being exerted onto the inside of the relining pipe 19 to form an annular collar or flange 22 around the widened opening.

Figure 4:
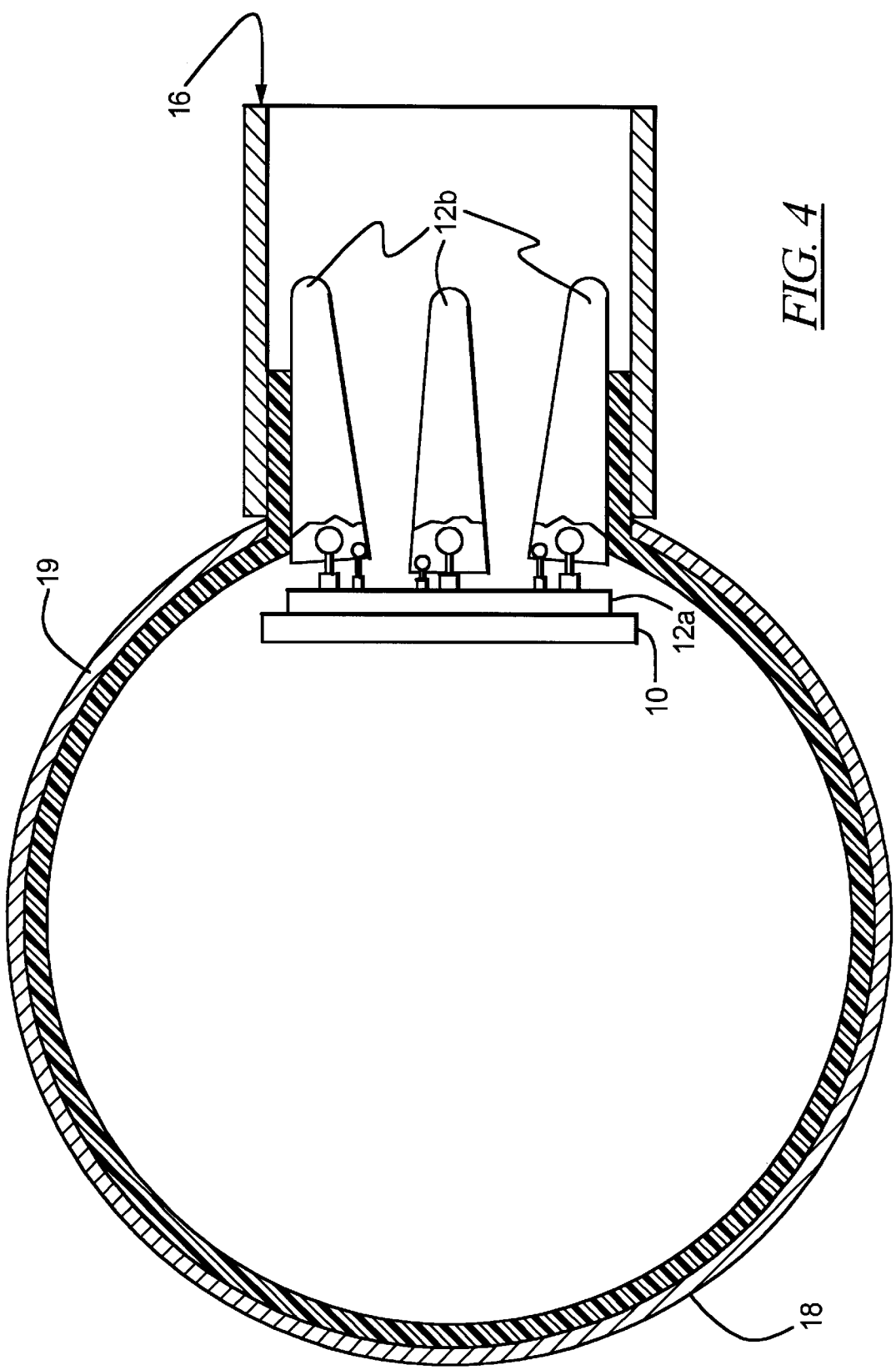

In FIG. 4, the annular collar or flange of the plastic material of the relining pipe 19 projects into the connecting pipe 16 and is applied to the inside of that end of the connecting pipe 16 pointing toward the principal pipe by moving of the outer fingers 12b radially outward and by rotation of the head 12.

Figure 5:
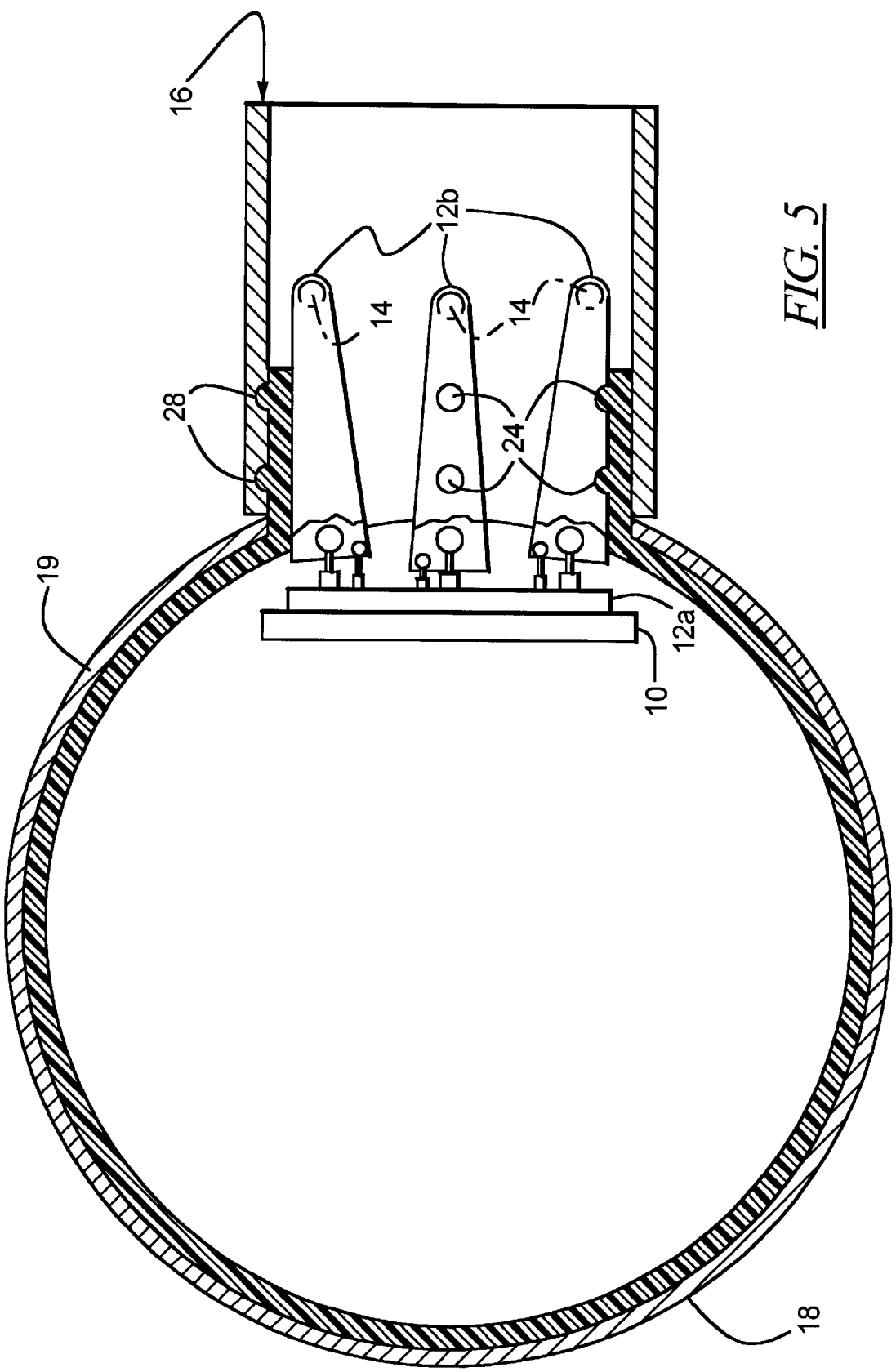

In FIG. 5, the collar or portion of the plastic material of the relining pipe 19 which projects into the connecting pipe 16 is secured in punctiform fashion at points 28 to the interior of the connecting pipe 16 by the punctiform heating with the heating devices 24. The fastening is undertaken, first, at a location situated at the left of FIG. 5.

Figure 6:
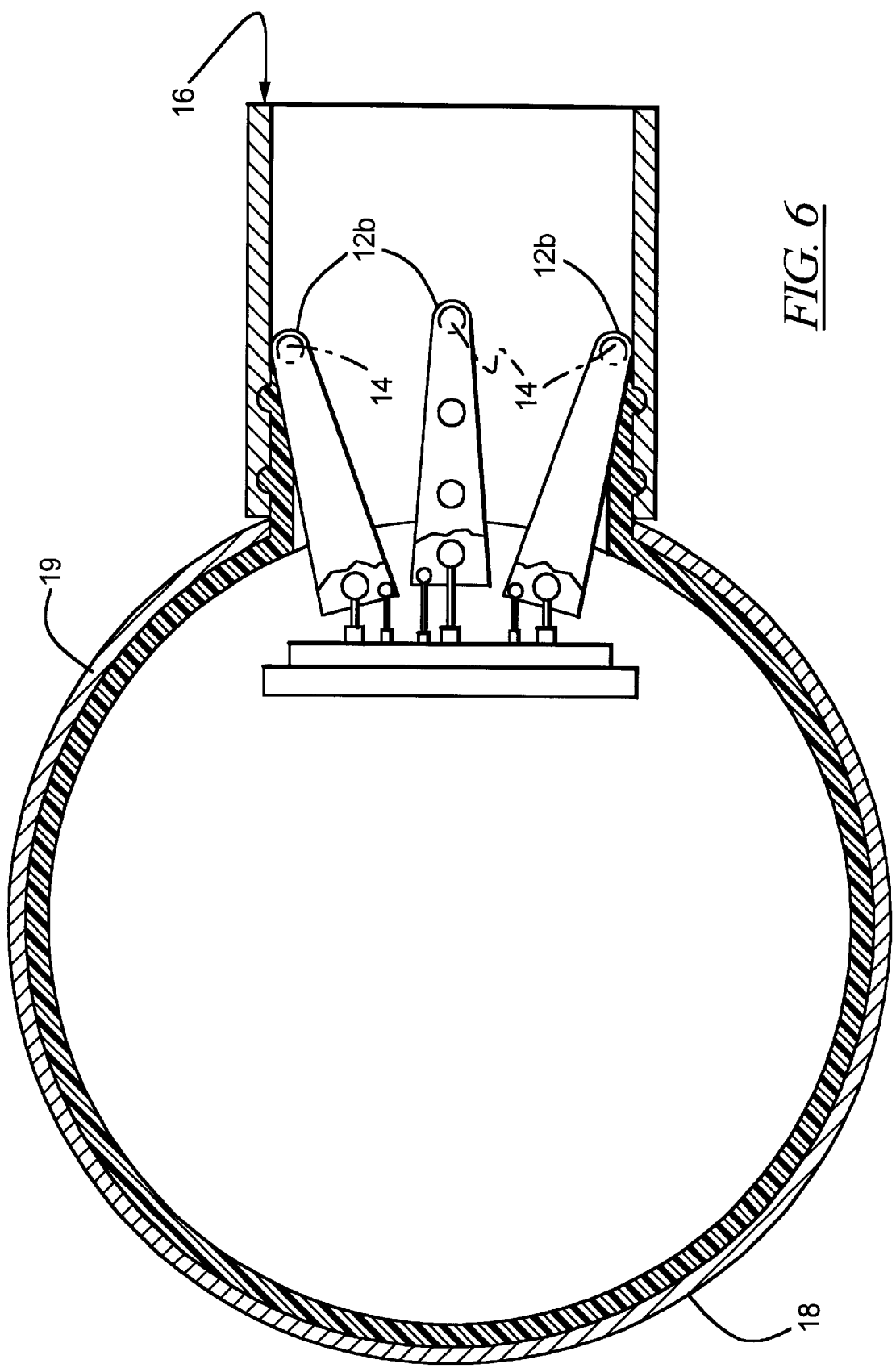

In FIG. 6, finally, the end of the flange or collar of the plastic material is flattened by heating with the heating devices 14 and is secured to the inside of the connecting pipe 16. This flattening causes the end to have a tapering configuration.

A suitable mechanism can also be employed instead of the hydraulic cylinders 20. For processing, which includes melting or shaping various plastic materials, the temperature in the working head 12 is matched to the respective plastic material. The monitoring of the shaping of the connection can be achieved with sensors in a semi-electronic or semi-mechanical way. Both oval as well as round openings can be opened. Likewise, openings having entry angles deviating from 90° angles can be opened.

A seepage of harmful substances into the ground is prevented by the flattening and fastening of the end of the annular flange or collar of the plastic material of the relining pipe 19 to the interior of the connecting pipe 16. In addition, the thickness of the applied plastic material can be modified, for example be reduced, by stretching during the processing event.

Although various minor modifications may be suggested by those versed in the art, it should be understood that we wish to embody within the scope of the patent granted hereon all such modifications as reasonably and properly come within the scope of our contribution to the art.

I claim:

1. A method for binding a connecting pipe to a principal pipe which has been reconstructed with a relining pipe of plastic material, said method comprising the steps of determining the mid-point of an opening in the principal pipe, which is located in the proximity of that end of the connecting pipe pointing toward the principal pipe, said step of determining occurring from the inside of the relining pipe; producing an opening in the relining pipe in the region of the mid-point by heating the plastic material of the relining pipe located in said region proceeding from the inside of the relining pipe; widening the produced opening by simultaneously exerting pressure onto the inside of the relining pipe in the direction toward the connecting pipe and heating the region of the plastic material on which the pressure is exerted proceeding from the inside toward the outside of the relining pipe to form a collar around the opening projecting into the end of the connecting pipe; applying a plastic material of the collar to an inside surface of the end of the connecting pipe pointing toward the principal pipe; fastening the plastic material of the collar to the inside of the connecting pipe; and further flattening and fastening the plastic material of the collar to the inside of the connecting pipe.

2. A method according to claim 1, wherein the step of determining utilizes ultrasound to determine the mid-point of the opening.

3. A method according to claim 1, wherein the step of determining utilizes a sonar technology to determine the mid-point of the opening.

4. A method according to claim 1, wherein the step of heating to produce an opening in the plastic pipe heats to a temperature dependent on the nature of the plastic material of the relining pipe.

5. A method according to claim 1, wherein the step of heating during widening of the opening is heating to a temperature selected to be dependent on the nature of the plastic material of the relining pipe.

6. A method according to claim 1, wherein the step of widening widens the opening into a round opening with a circular collar.

7. A method according to claim 1, wherein the step of widening widens the opening into an oval-shaped opening with an oblong collar.

8. A method according to claim 1, wherein the step of fastening the collar of the plastic material projecting into the connecting pipe begins by applying the material to the end of the connecting pipe facing the principal pipe.

9. A method according to claim 1, which further includes securing the collar of the plastic material to the inside of the connecting pipe by gluing.

10. A method according to claim 1, which further includes the step of securing the collar of the plastic material to the inside of the connecting pipe by welding.

11. A method according to claim 1, wherein the end of the collar of the plastic material is flattened by heating.

12. A method according to claim 1, wherein the end of the collar of the plastic material is flattened by a step of stretching the end.

13. A method according to claim 1, wherein the end of the collar of the plastic material is secured to the inside of the connecting pipe by gluing.

14. A method according to claim 1, wherein the end of the collar of the plastic material is secured to the inside of the connecting pipe by welding.

15. A method according to claim 1, wherein the shaping of the connection is monitored semi-electronically.

16. A method according to claim 1, wherein the shaping of the connection is monitored semi-mechanically.

\* \* \* \* \*